(12) United States Patent
Solanki

(10) Patent No.: US 10,578,330 B2
(45) Date of Patent: Mar. 3, 2020

(54) SYSTEM FOR MONITORING AND CONTROLLING DEVICES AND METHOD THEREOF

(71) Applicant: Rajesh Ramnik Solanki, Mumbai (IN)

(72) Inventor: Rajesh Ramnik Solanki, Mumbai (IN)

( * ) Notice: Subject to any disclaimer, the term of this patent is extended or adjusted under 35 U.S.C. 154(b) by 61 days.

(21) Appl. No.: 15/738,682

(22) PCT Filed: Jun. 21, 2016

(86) PCT No.: PCT/IN2016/050191
§ 371 (c)(1),
(2) Date: Dec. 21, 2017

(87) PCT Pub. No.: WO2016/207908
PCT Pub. Date: Dec. 29, 2016

(65) Prior Publication Data
US 2018/0172308 A1    Jun. 21, 2018

(30) Foreign Application Priority Data

Jun. 21, 2015   (IN) .......................... 1458/MUM/2015

(51) Int. Cl.
*F24F 11/46*        (2018.01)
*G05B 15/02*        (2006.01)
(Continued)

(52) U.S. Cl.
CPC ............ *F24F 11/46* (2018.01); *B60H 1/3211* (2013.01); *F24F 11/30* (2018.01); *F24F 11/52* (2018.01);
(Continued)

(58) Field of Classification Search
CPC ........ F24F 11/46; F24F 11/52; F24F 2110/10; G05B 15/02
See application file for complete search history.

(56) References Cited

U.S. PATENT DOCUMENTS 7,809,472 B1   10/2010   Silva
9,557,750 B2 *  1/2017   Gust ...................... G05D 23/19
(Continued)

*Primary Examiner* — Vincent H Tran
(74) *Attorney, Agent, or Firm* — DeLio Peterson & Curcio LLC; Robert Curcio

(57) ABSTRACT

The present invention provides a system for conservation and efficient use of energy through controlling and monitoring of devices, the system comprising at least one structure, wherein the structure comprises at least one zone, wherein the zone comprises at least one sensor configured to capture ambient data; at least one device; and at least one processing controller connected to the sensor and the device, the processing controller configured to receive the ambient data from the sensor and operating parameters from the device; a user module configured to receive input parameters from a plurality of users; an admin module configured to provide pre-defined parameters for operating the device adapted in the zone of the structure and manage and view the device adapted in the zone of the structure; a central processing module, connected to the structure, the user module, and the admin module through wired and/or wireless connection, the central processing module configured to process the data received from the processing controller adapted in the zone of the structure and generate the optimum parameters for operating the device adapted in the zone of the structure.

8 Claims, 4 Drawing Sheets

(51) Int. Cl.

| | | |
|---|---|---|
| *F24F 11/30* | (2018.01) | |
| *F24F 11/62* | (2018.01) | |
| *F24F 11/52* | (2018.01) | |
| *G06Q 50/06* | (2012.01) | |
| *B60H 1/32* | (2006.01) | |
| *G06Q 10/10* | (2012.01) | |
| *G06Q 50/00* | (2012.01) | |
| *F24F 110/00* | (2018.01) | |
| *F24F 110/20* | (2018.01) | |
| *F24F 110/10* | (2018.01) | |

(52) U.S. Cl.
CPC .............. *F24F 11/62* (2018.01); *G05B 15/02* (2013.01); *G06Q 10/10* (2013.01); *G06Q 50/01* (2013.01); *G06Q 50/06* (2013.01); *B60H 2001/3272* (2013.01); *F24F 2110/00* (2018.01); *F24F 2110/10* (2018.01); *F24F 2110/20* (2018.01); *G05B 2219/2639* (2013.01); *G05B 2219/2642* (2013.01)

(56) References Cited

U.S. PATENT DOCUMENTS

| | | | | |
|---|---|---|---|---|
| 9,639,413 B2 * | 5/2017 | Drees | ..................... | G05B 15/02 |
| 9,996,091 B2 * | 6/2018 | Wells | ................. | G05D 23/1902 |
| 10,001,293 B2 * | 6/2018 | Schmidlin | ................ | F24F 11/30 |
| 10,187,707 B2 * | 1/2019 | Norwood | ................. | H04Q 9/00 |
| 2007/0214264 A1 | 9/2007 | Koister | | |
| 2007/0239317 A1 | 10/2007 | Bogolea | | |
| 2009/0065596 A1 * | 3/2009 | Seem | ....................... | F24F 11/30 236/51 |
| 2010/0145534 A1 * | 6/2010 | Forbes, Jr. | ............. | G06Q 10/00 700/291 |
| 2010/0211224 A1 | 8/2010 | Keeling | | |
| 2011/0095897 A1 | 4/2011 | Sutrave | | |
| 2011/0106328 A1 * | 5/2011 | Zhou | .................... | G05B 13/024 700/291 |
| 2012/0232701 A1 * | 9/2012 | Carty | .................... | G05B 15/02 700/277 |
| 2013/0158721 A1 * | 6/2013 | Somasundaram | ............................ | G05D 23/1917 700/276 |
| 2013/0190940 A1 * | 7/2013 | Sloop | ..................... | G05B 15/02 700/291 |
| 2014/0052300 A1 * | 2/2014 | Matsuoka | .......... | G05D 23/1917 700/276 |
| 2014/0222241 A1 * | 8/2014 | Ols | ........................ | G05B 15/02 700/299 |
| 2014/0277768 A1 | 9/2014 | Watts | | |
| 2014/0282186 A1 | 9/2014 | Joyner | | |
| 2014/0358297 A1 * | 12/2014 | Fadell | ................ | G05D 23/1902 700/278 |
| 2015/0019024 A1 * | 1/2015 | Sabripour | .......... | G05D 23/1927 700/276 |
| 2015/0227870 A1 * | 8/2015 | Noboa | ............... | G06Q 10/0635 705/7.28 |

* cited by examiner

SYSTEM FOR MONITORING AND CONTROLLING DEVICES AND METHOD THEREOF

BACKGROUND OF THE INVENTION

1. Field of the Invention

The present invention relates to a system and method for conservation and efficient use of energy through monitoring and controlling of devices.

2. Description of Related Art

The internet over a period of time has made a significant impact on the behavior pattern of a society in a way the services are consumed and managed.

The current technologies available in the market allow users to remotely access and control smart appliances or devices such as refrigerator, air conditioner, microwave, etc. connected to the internet. The remote control of the devices via internet allows the user to manage the devices without being physically present.

However, in an environment where the smart appliances or devices need to be monitored and controlled based on multiple user preferences or choices are not present. Moreover, energy consumption of such devices is not regulated to provide the optimum use of the energy.

In view of above, it is required to provide a system or a method that overcomes above-mentioned problems.

SUMMARY OF THE INVENTION

The present invention provides a system and a method for conservation and efficient use of energy through monitoring and controlling of devices.

The present invention in first embodiment provides a system for conservation and efficient use of energy through controlling and monitoring of devices. The system comprising at least one structure, the structure comprises of at least one zone, the zone of the structure comprises at least one sensor configured to capture ambient data, at least one device, and at least one processing controller connected to the sensor and the device. The processing controller is configured to receive the ambient data from the sensor and operating parameters from the device. A user module is configured to receive input parameters from a plurality of users. An admin module is configured to provide pre-defined parameters for operating the device adapted in the zone of the structure and manage and view the device adapted in the zone of the structure. A central processing module, connected to the structure, the user module, and the admin module through wired and/or wireless connection. The central processing module is configured to process the data received from the processing controller adapted in the zone of the structure and generate the optimum parameters for operating the device adapted in the zone of the structure.

The present invention in second embodiment provides a method for conservation and efficient use of energy through controlling and monitoring of devices, the method comprising the steps of receiving input parameters from a sensor adapted in a zone of a structure; receiving input parameter from a customer user through a user module; receiving operating parameters of a device adapted in the zone of the structure; processing the received data from a processing controller connected to the sensor, the device and user module stored in a central database unit of the central processing module and pre-defined logic parameters stored in a pre-defined logic unit of the central processing module in a processing unit of a central processing module; generating the optimum parameters to operate the device; and sending instructions to the processing controller to operate the device at the generated optimum parameters.

BRIEF DESCRIPTION OF THE DRAWINGS

Reference will be made to embodiments of the invention, examples of which may be illustrated in the accompanying figure. This figure is intended to be illustrative, not limiting. Although the invention is generally described in the context of these embodiments, it should be understood that it is not intended to limit the scope of the invention to these particular embodiments.

DESCRIPTION OF THE EMBODIMENT(S)

Figure 1:
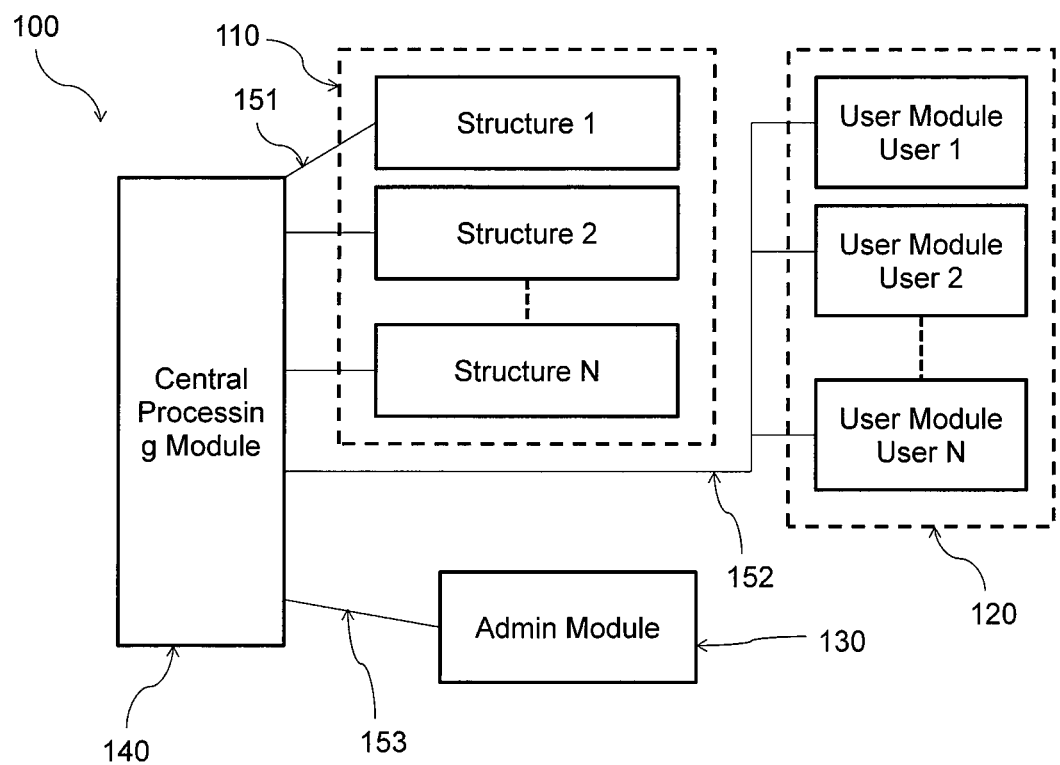
FIG. 1 shows a system for conservation and efficient use of energy through monitoring and controlling of devices according to an embodiment of the present invention.

The present invention provides a system and a method for conservation and efficient use of energy through monitoring and controlling of devices.

Accordingly, the present invention in first embodiment provides a system for conservation and efficient use of energy through monitoring and controlling of devices, the system comprising at least one structure, a user module, an admin module, and a central processing module connected to the structure, the user module, and the admin module through wired and/or wireless connection.

The invention described herein is explained using specific exemplary details for better understanding. However, the invention disclosed can be worked on by a person skilled in the art without the use of these specific details.

Throughout this application, with respect to all reasonable derivatives of such terms, and unless otherwise specified (and/or unless the particular context clearly dictates otherwise), each usage of:

"a" or "an" is meant to read as "at least one."

"the" is meant to be read as "the at least one."

References in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

Hereinafter, the preferred embodiments of the present invention will be described in detail. For clear description of the present invention, known constructions and functions will be omitted.

Parts of the description may be presented in terms of operations performed by a computer system, using terms such as data, state, link, fault, packet, and the like, consistent with the manner commonly employed by those skilled in the art to convey the substance of their work to others skilled in the art. As is well understood by those skilled in the art, these quantities take the form of data stored/transferred in the form of electrical, magnetic, or optical signals capable of being stored, transferred, combined, and otherwise manipulated through mechanical and electrical components of the computer system; and the term computer system includes general purpose as well as special purpose data processing machines, switches, and the like, that are standalone, adjunct or embedded.

For instance, some embodiments may be implemented by a processing system that executes program instructions so as to cause the processing system to perform operations involved in one or more of the methods described herein. The program instructions may be computer-readable code, such as compiled or non-compiled program logic and/or machine code, stored in a data storage that takes the form of a non-transitory computer-readable medium, such as a magnetic, optical, and/or flash data storage medium.

Moreover, such processing system and/or data storage may be implemented using a single computer system or may be distributed across multiple computer systems (e.g., servers) that are communicatively linked through a network to allow the computer systems to operate in a coordinated manner.

According to the present invention, the structure comprises at least one zone, wherein each zone comprises at least one sensor for capturing ambient parameters, at least one device such as an air conditioner, an electric light, etc. and at least one processing controller connected to the sensor and the device. The device also includes external devices such as sensors and genset adapted inside and outside of the structure. More particularly, the sensors are adapted inside the zone to capture ambient parameters such as occupancy data and other measurable condition including temperature and humidity.

According to the present invention, the processing controller is configured to receive ambient parameters from the sensor and various operating parameters of the device; considering the device being an air conditioner; the processing controller receives the operating temperature of the air conditioner, electricity consumption, cycle operation of compressor etc. and sends the received data from the sensor and the device to the central processing module. Advantageously, the processing controller is adapted to receive instructions from a processing unit of the central processing module to operate the device at generated optimum parameters to conserve and efficient use of energy.

According to the present invention, the user module comprises a user registration unit, a user input unit, a support unit, a maintenance unit, and a social unit. The user registration unit is used to register the user to the system. The user registration unit facilitates the authorization of the user to use various functionalities of the user module configured from the admin module such as a customer user is authorized only to use the user input unit, the support unit, and the social unit; a maintenance user is authorize to use all the unit, for example, the maintenance user is registered as a maintenance staff and is able to view support request generated by the customer user regarding the functioning of the device from the support unit.

For example, the customer user is authorized to send the input parameters for the specific zone of the structure to which it has been registered and is able join the social unit to view the information of the registered customer users of the structure and the energy data consumed by the devices connected to those structures and energy saving data of the structure. Advantageously, the user can be authorized to send input to all the devices adapted in different zones of the structure or different zones of different structures.

According to the present invention, the user input unit is configured to provide graphical design input such as smiley representing various emotions that are expressed to describe the environmental conditions of the structure by the customer user. Advantageously, the user input unit is adapted to provide options for providing input for different devices of the system such as air conditioner and electric light for which the user can provide the input parameters for operation. Moreover, other input parameters can be configured in the user input unit such as hysteresis.

According to the present invention, the admin module is configured to fetch the data from the central processing module, process the fetched data, and adapted to display the fetched data on electronic device such as laptop, tablet, mobile, etc. Advantageously, the admin module allows the admin user to view the details of each device connected to the system, the details are listed based on the structure and zones allowing the user to easily view the information of each device such as its performance, working condition, etc. The admin module further provides the details of the parameters input by the user registered in the user module thereby facilitating the admin user to view the behaviour of all the registered users of the system. Moreover, the admin module facilities the admin user to remotely manage the device such as changing the operating parameters of the device based on the received parameters. Furthermore, the admin module comprises registration and access unit which allows a master admin user to register admin user and authorize access right based on their role and responsibility.

According to the present invention, the central processing module comprises a central database unit adapted to store the data received from the processing controller, a pre-defined logic unit adapted to receive the input from the admin module, and the processing unit configured to fetch the data from the central database and the pre-defined logic unit, process the data and sends the instructions to the processing controller to operate the device at generated optimum parameters. The generation of the optimum parameters for operating the device includes pre-defined hysteresis, user input hysteresis, number of cycles of compressor, optimum parameter to operate the device efficiently and conserve energy, and energy index, for example, the energy index for the device of the type air conditioner is energy consumption by air conditioner per square unit area.

According to the present invention, user input regarding operating of device is captured by the user module and transferred to the processing controller connected wired or wireless. The user data is then transferred to the central processing module, where the processing unit process the data based on the various input parameters and considering the user input, generates the optimum parameters and instructs the processing controller to operate the device at the generated optimum parameter. Advantageously, multiple inputs from the customer user can be received by the processing controller, the processing unit processes the data based on the input received from the user, sensor parameters, device operating parameters, and pre-defined logic parameters to generate optimum parameters for operating the device. Therefore, the energy conservation of the devices can be maintained by operating the devices at the optimum parameters generated by the processing unit. The pre-defined parameter includes hysteresis and other operating parameters that are used to efficiently operate the device.

Advantageously, the pre-defined logic unit is configured to automatically alter the hysteresis based on various operating parameters of the device and operating condition to operate the device at optimum parameter and conserve energy.

For example, the operation of the system for controlling of the devices is performed as follows, the plurality of the user registered to the system through the user module located in a section of the office such as customer care section having two (2) air conditioners and four (4) lighting installed. The user being a customer care representative sitting in the section is feeling hot, the user can input the parameter through an user input unit of user module configured on his mobile. The input parameter is in form of a smiley, for example, smiley having red color resembles hot. Once, the user input parameter is received by the processing controller installed in the customer care section, the input data is transferred to the central database of the central processing module. The processing unit of the central processing module on receipt of the user input process the user input including the hysteresis, if any, given by the user, the ambient parameter such as temperature received from the sensor, the operating parameters of the device, and the pre-defined logic stored in the pre-defined logic unit of the central processing module; generates the optimum parameters based on the processed data and instructs the processing controller to operate the air conditioner at the generated optimum parameter to conserve energy. The process of generating the optimum parameters by the processing unit to conserve energy includes ambient parameters received by the sensor; operating parameters of the device; user input including hysteresis, if any; number of cycle of compressor; optimum parameters to operate the device efficiently to conserve energy; energy index i.e. energy consumption per square feet by the device; and other external factors. However, during the processing and generation of the optimum parameters to operate the device energy conservation is of utmost importance.

For example, the operation of the system for monitoring of the devices is performed as follows; a user of the system through the admin module configured on his laptop is able to view the data of various operating parameters of the device and user activity log received from the central processing module. The admin user based on authorization access is able to view the operation of the all the devices connected to the system and can operate the performance of the devices remotely by sending the instructions to the processing controller through the processing unit of the central processing module. Advantageously, the admin module is configured view the activity log of the user registered in the system and their behavior pattern.

Accordingly, the present invention in second embodiment provides a method for conservation and efficient use of energy through monitoring and controlling of devices, the method comprising the steps of receiving input from the sensor and the devices adapted inside the zone of the structure; receiving input parameters from the customer user including hysteresis, if any, through the user module; receiving input from the pre-defined logic unit of the central processing module including pre-defined hysteresis, number of cycles of compressor, optimum parameters to operate the device efficiently; processing the data received from the sensors and the devices stored in the central database of the central processing module and the pre-defined logic stored in the pre-defined logic unit in the processing unit of the central processing module; generating the optimum parameters for operating the device adapted in the zone of the structure to conserve energy; transferring the optimum parameters generated by the processing unit to the processing controller adapted in the zone to operate the device at the generated optimum parameter for conservation and efficient use of energy.

The subject matter is now described with reference to the drawing, wherein like reference numerals are used to refer to like elements throughout. In the following description, for purpose of explanation, numerous specific details are set forth in order to provide a thorough understanding of the claimed subject matter. It may be evident however, that such matter can be practiced with these specific details. In other instances, well-known structures as shown in diagram form in order to facilitate describing the invention.

Referring FIG. 1 shows a system (100) for conservation and efficient use of energy through monitoring and controlling of devices according to the present invention. As shown in FIG. 1, the system (100) comprises at least one structure (110), a user module (120), an admin module (130), and a central processing module (140) connected to the structure (110), the user module (120), and the admin module (130).

As shown in FIG. 1, the structure (110) comprises of at least one zone (not shown) wherein the zone (not shown) comprises of at least one device (not shown), at least one sensor (not shown) and at least one processing controller (not shown) connected to the device (not shown) and the sensor (not shown). The processing controller (not shown) is configured to receive input parameters from the customer user of the user module (120), the sensor (not shown) and the devices (not shown) and transfer the received parameter to the central processing module (140).

As shown in FIG. 1, the central processing module (140) comprises a central database unit (not shown) adapted to store the data received from the processing controller (not shown), a pre-defined logic unit (not shown) adapted to receive the input from the admin module (130), and the processing unit (not shown) configured to fetch the data from the central database unit (not shown) and the pre-defined logic unit (not shown), process the data and sends the instructions to the processing controller (not shown) to operate the device (not shown) at generated optimum parameters to conserve energy.

As shown in FIG. 1, the admin module (130) is configured to provide initial operating parameters of the device (not shown) including hysteresis parameter, number of cycles of compressor, and the optimum parameter to operate the device efficiently to the pre-defined logic unit (not shown) of the central processing module (240) for controlling of the devices for conservation and efficient use of energy. The admin module (130) further provides admin user to view the data of the each device of the system, user activity log, user behaviour pattern, and remote control to device to operate it at optimum parameters.

Figure 2:
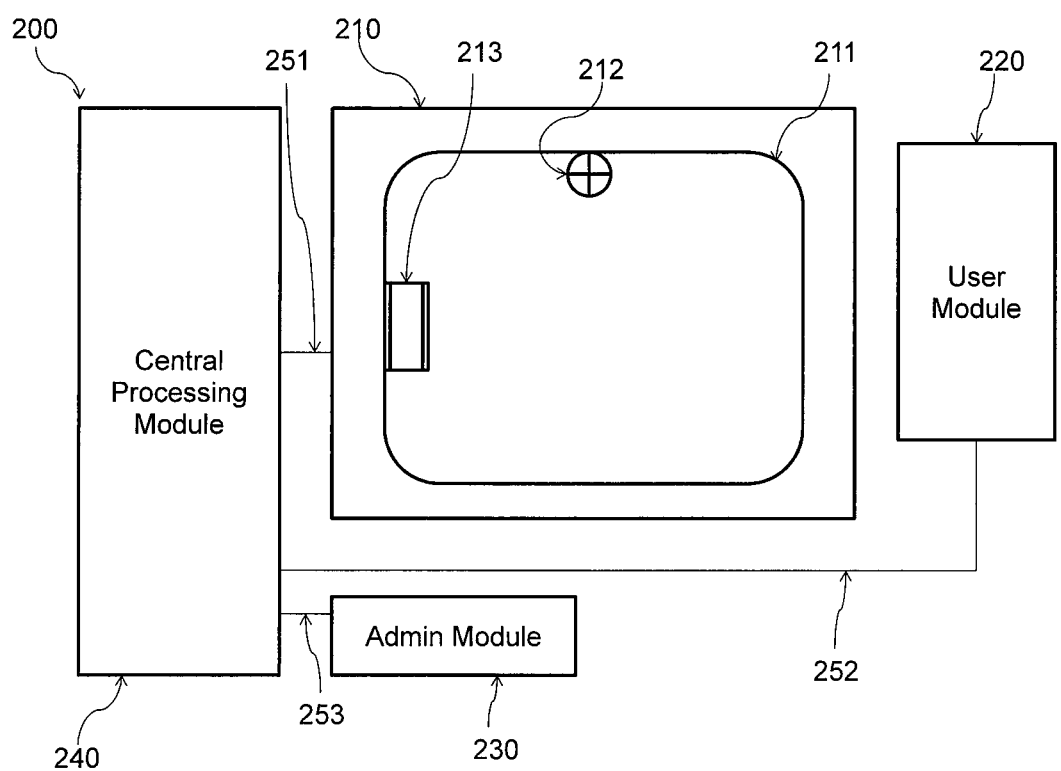
FIG. 2 shows a detail view of a structure of the system described in FIG. 1 according to an embodiment of the present invention.

Referring FIG. 2 shows a system (200) for conservation and efficient use of energy through monitoring and controlling of devices according to the present invention. The system (200) comprises a structure (210), a user module (220), an admin module (230), and a central processing module (240) connected to the structure (210), the user module (220), and the admin module (230) through wired and/or wireless connection (251, 252, 253).

As shown in FIG. 2, the structure (210) comprises a zone (211), wherein the zone (211) comprises a sensor (212) for capturing ambient parameters, a device (213) including but not limited to air conditioner, electric light, and a processing controller (214) connected to the device (213) and the sensor (212). The processing controller (214) configured to receive the parameters from the sensor (212), the device (213) and from the customer user through the user module (220) connected wired and/or wireless and transfer the received input parameters to the central database unit (not shown) of the central processing module (240). Advantageously, the processing controller (214) is configured to receive multiple parameters from plurality of the sensor (212), the device (213), and the customer user from the user module (220).

As shown in FIG. 2, the central processing module (240) comprises the central database unit (not shown) adapted to store the data received from the processing controller (214), a pre-defined logic unit (not shown) adapted to receive the input from the admin module (230), and the processing unit (not shown) configured to fetch the data from the central database (not shown) and the pre-defined logic unit (not shown), process the data and sends the instructions to the processing controller (214) to operate the device (213) at generated optimum parameters to conserve energy.

As shown in FIG. 2, the admin module (230) is configured to provide initial operating parameters of the devices (213) including hysteresis parameters, number of cycles of compressor, energy index i.e. energy consumption per square feet, optimum parameters to operate the device efficiently to the pre-defined logic unit (not shown) of the central processing module (240) for controlling of the devices for conservation and efficient use of energy.

Figure 3:
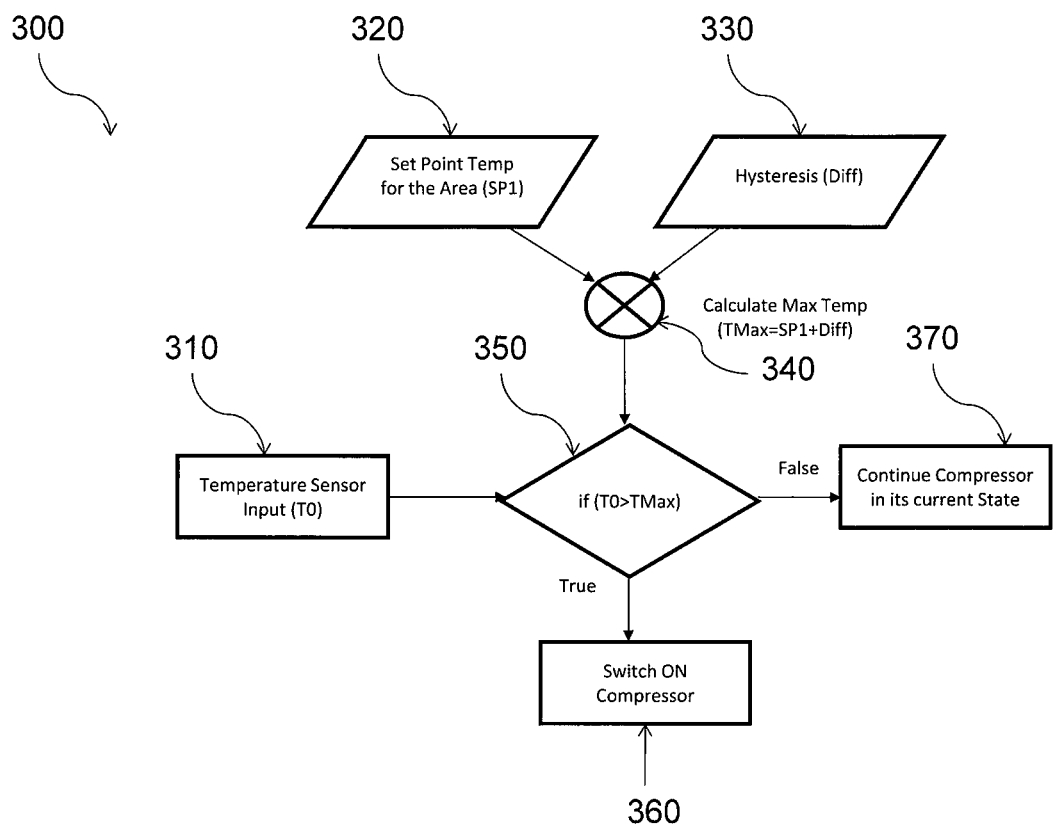
FIG. 3 shows a method of controlling a device for conservation and efficient use of energy such as air conditioner to switch on state according to an embodiment of the present invention.

Referring FIG. 3 shows a method (300) of controlling a device for conservation and efficient use of energy such as air conditioner to switch on state. The method (300) comprises the steps of receiving input ambient parameter (T0) from a sensor(s) adapted in a zone such as room temperature (310); receiving input parameter (SP1) from a customer user through a user module, wherein the input parameter includes hysteresis (320); receiving hysteresis parameters stored in pre-defined logic of the central processing module (330); processing the input parameters received to determine Tmax based on the customer input parameter (SP1) and hysteresis i.e. Tmax=SP1+Diff (340); comparing the input ambient parameters received from the sensor(s) (T0) with calculated Tmax (350) i.e. if the input parameter from the sensor (T0) is greater than calculated Tmax, switch on the air conditioner (360) otherwise continue compressor in current state (370).

Figure 4:
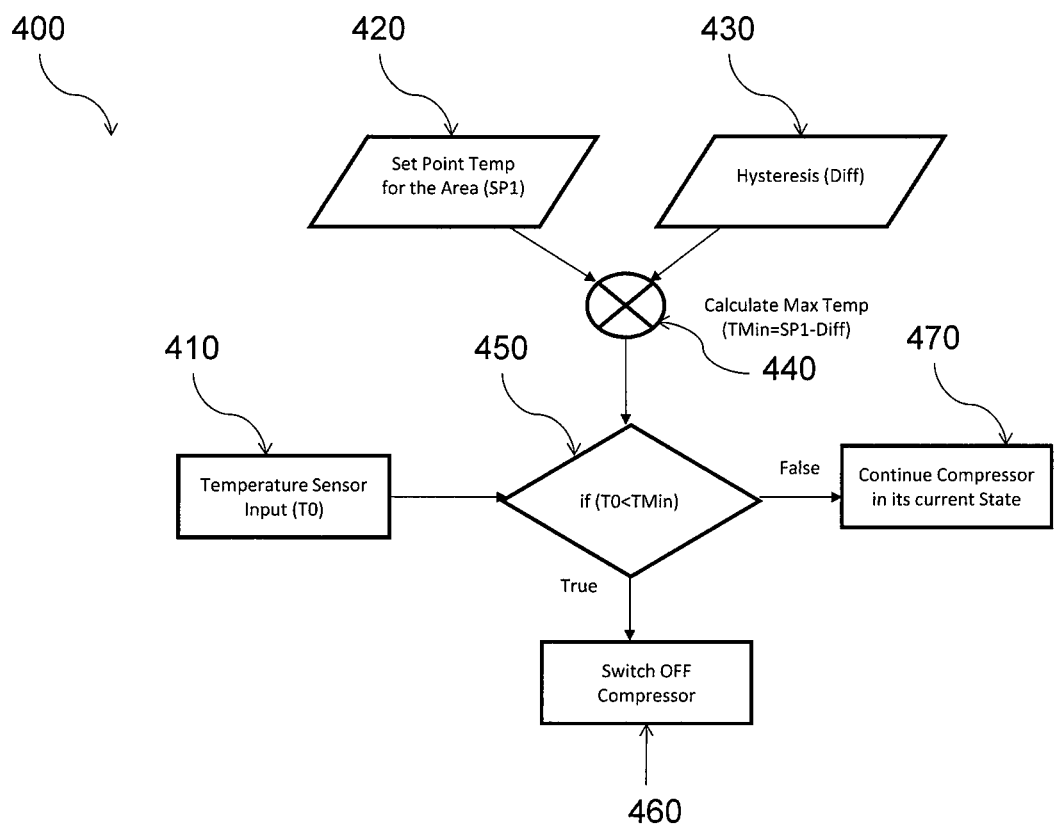
FIG. 4 shows a method of controlling a device for conservation and efficient use of energy such as air conditioner to switch off state according to an embodiment of the present invention

Referring FIG. 4 shows a method (400) of controlling a device for conservation and efficient use of energy such as air conditioner to switch off state. The method (400) comprises the steps of receiving input ambient parameters (T0) from a sensor(s) adapted in a zone such as room temperature (410); receiving input parameters (SP1) from a customer user through a user module, wherein the input parameter includes hysteresis (420); receiving the hysteresis parameters stored in pre-defined logic of the central processing module (430); processing the input parameters to determine Tmin based on the customer input parameter (SP1) and hysteresis i.e. Tmin=SP1-Diff (440); comparing the input parameter from the sensor (T0) with calculated Tmin (450) i.e. if the input parameter from the sensor (T0) is less than calculated Tmin, switch off the air conditioner (460) otherwise continue compressor in current state (470).

The operations need not be performed in the disclosed order, although in some examples, an order may be preferred. Also, not all functions need to be performed to achieve the desired advantages of the disclosed system and method, and therefore not all functions are required.

While select examples of the disclosed system and method have been described, alterations and permutations of these examples will be apparent to those of ordinary skill in the art. Other changes, substitutions, and alterations are also possible without departing from the disclosed system and method in its broader aspects.

Thus, having described the invention, what is claimed is:

1. A system for conservation and efficient use of energy through controlling and monitoring of devices, the system comprising:
    at least one structure, wherein the structure comprises at least one zone, wherein the zone comprises:
        at least one sensor configured to capture ambient data;
        at least one device; and
        at least one processing controller connected to the sensor and the device, the processing controller configured to receive the ambient data from the sensor and operating parameters from the device;
    a user module configured to receive input parameters from a plurality of users, wherein the user module comprises:
        a user registration unit for registration and authorization access to the user based on type of the user;
        a user input unit configured to receive user input;
        a support unit for allowing user to generate ticket for support in case the device is not functioning properly;
        a maintenance unit configured to allow at least one maintenance user to view the operating details of the device and the support ticket generated by the user from the support unit; and
        a social unit configured to allow the user to view all the registered user of the system and the energy conservation data of each structure and zone;
    an admin module configured to provide pre-defined parameters for operating the device adapted in the zone of the structure and manage and view the device adapted in the zone of the structure;
    a central processing module, connected to the structure, the user module, and the admin module through wired and/or wireless connection, the central processing module configured to process the data received from the processing controller adapted in the zone of the structure and generate the optimum parameters for operating the device adapted in the zone of the structure.

2. The system as claimed in claim 1, wherein the user input unit comprises of graphical representation to receive customer user input.

3. The system as claimed in claim 1, wherein the user input unit facilitates customer user to input hysteresis parameters.

4. The system as claimed in claim 1, wherein the admin module is configured to fetch the data from the central processing module, process the fetched data, and adapt to display the fetched data on electronic device such as laptop, tablet, mobile, etc.

5. The system as claimed in claim 1, wherein the admin module is configured to provide various input parameters to a pre-defined logic unit of the central processing module such as hysteresis parameters, number of cycle of compressor, energy index, operating parameter for each device adapted in the zone of the structure to operate efficiently and conserve energy.

6. The system as claimed in claim 1, wherein the admin module is configured to authorize access right of the users registered in the system.

7. The system as claimed in claim 1, wherein the central processing module comprises:
    a central database unit for storing the data received from the processing controller adapted in the zone of the structure;

a pre-defined logic unit configured to receive input parameter from the admin module to operate the device at optimum parameter; and a processing unit configured to fetch the data from the central database unit and the pre-defined logic unit, process the data and generate the optimum parameters for operating of the device and send the instructions to the processing controller to operate the device at the generated optimum parameters for conservation and efficient use of energy.

8. The system as claimed in claim 7, wherein the processing unit generates the optimum parameters to operate the device includes pre-defined hysteresis, customer user input hysteresis parameters, number of cycle running the compressor, energy index i.e. energy consumption per square feet by the device, and parameters to efficiently operate the device and conserve energy.

* * * * *